Oct. 6, 1964  J. V. MICHEL  3,151,826
MOORING DEVICE FOR V.T.O.L. AIRCRAFT
Filed Feb. 20, 1962  5 Sheets-Sheet 1

INVENTOR
Jan Victor Michel
BY Bailey, Stephens & Huettig
ATTORNEYS

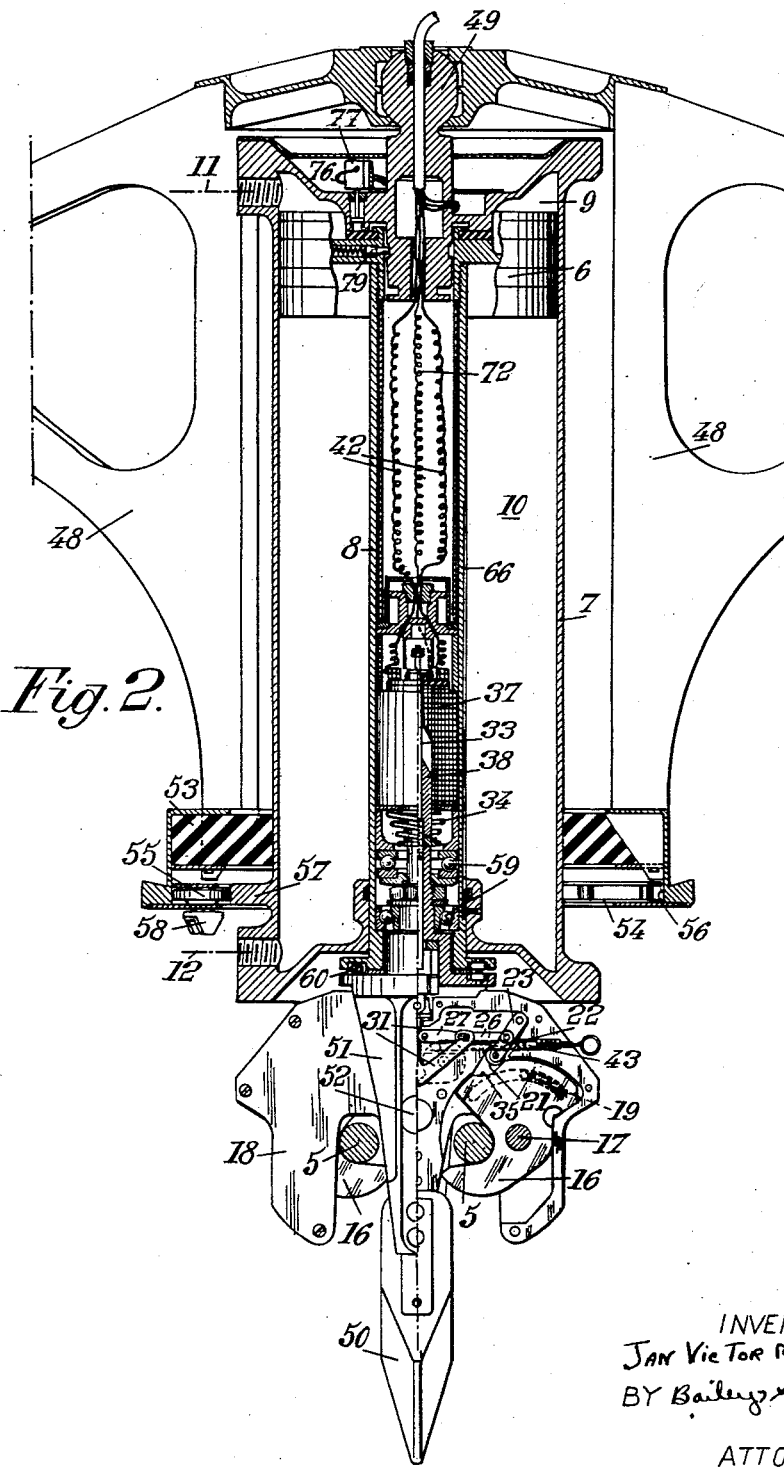

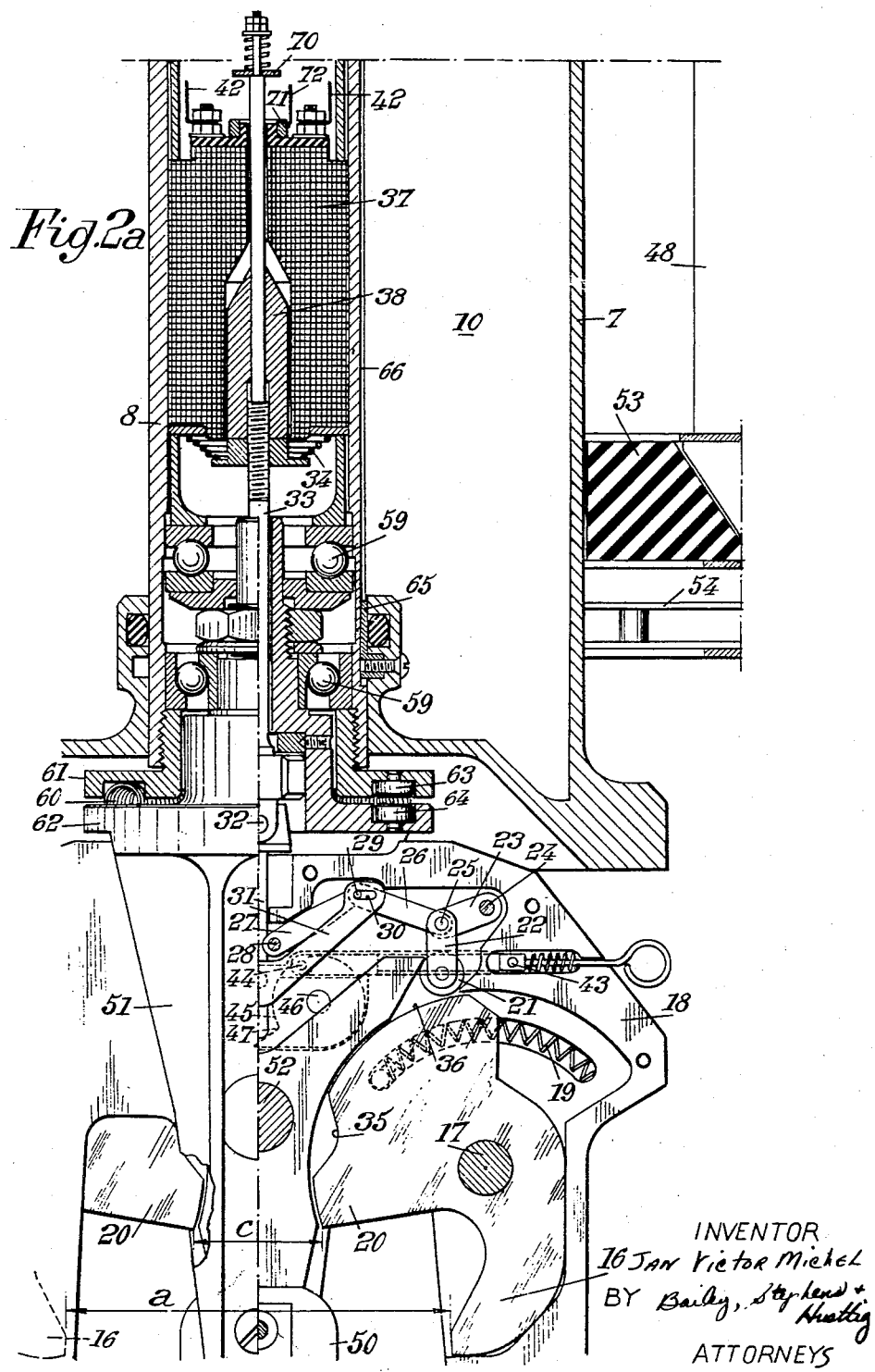

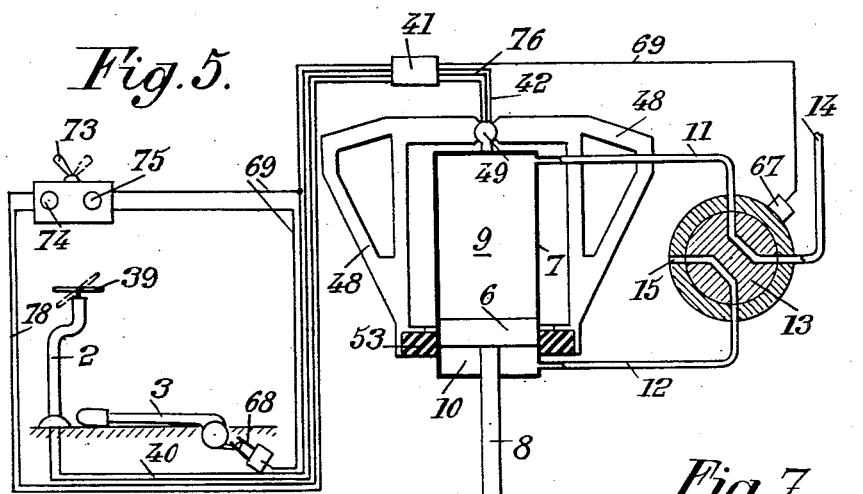
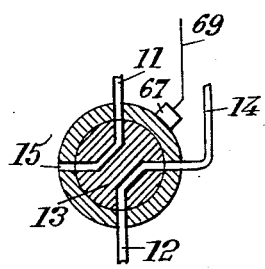
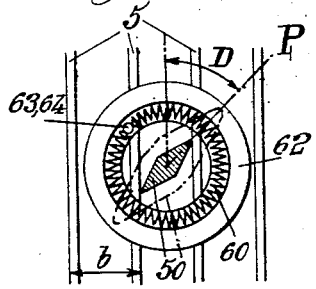
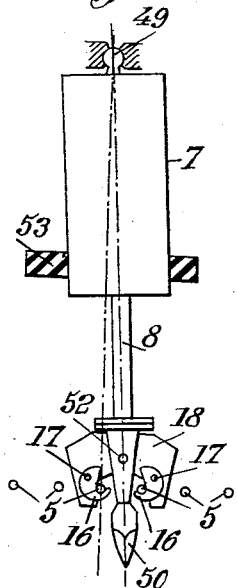
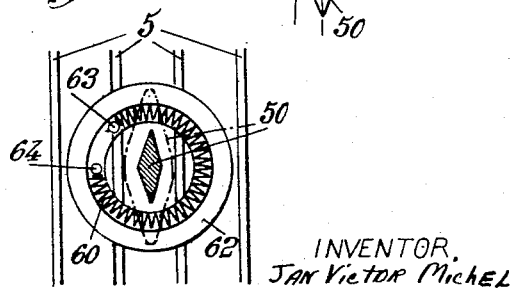

United States Patent Office 3,151,826
Patented Oct. 6, 1964

3,151,826
MOORING DEVICE FOR V.T.O.L. AIRCRAFT
Jan Victor Michel, Villa "Les Ailes Bleues,"
Blvd. des Tasses, Saint-Raphael, France
Filed Feb. 20, 1962, Ser. No. 174,435
Claims priority, application France, Mar. 11, 1961,
855,320
6 Claims. (Cl. 244—115)

The present invention has for its object a mooring device for securing to a landing platform a V.T.O.L. aircraft and more especially a helicopter, this mooring device being operated from the aircraft. In order to simplify the following description the term "helicopter" will be used hereinafter to designate the V.T.O.L. aircraft, but it should be well understood that what is said of helicopters applies to other V.T.O.L. aircraft.

The device according to this invention must comply with the following conditions:

When the helicopter is landing on a platform where wind is blowing and/or which is not stable, and in particular when this helicopter is landing on the deck of a ship, the device must achieve an instantaneous and preferably automatic mooring of the helicopter so as to avoid any displacement thereof with respect to the platform, at least until the helicopter has been fully fastened to the ship through any suitable means.

When taking off, after removal of said fastening means, the mooring device must retain the helicopter until said device is released by the pilot. For this purpose, according to my invention, the mooring device consists of the combination of a horizontal, or substantially horizontal, grid mounted on the platform and of a support for hooking means capable of cooperating with at least one of the bars of the grid, this support being mounted on the helicopter in such manner that it can receive either a downward effort which lowers it with respect to the helicopter at the time of landing until the hooking means have been engaged with the grid, or an upward effort which, when said hooking means are in action, applies the helicopter against the grid and secures it to the platform and, when the hooking means are subsequently retracted by the action of the pilot, pulls up the support above the plane upon which the landing gear is resting.

Other features of my invention will become apparent in the course of the following detailed description of a preferred embodiment thereof with reference to the appended drawings given merely by way of example, and in which:

FIG. 2 is a diagrammatic vertical axial section, on an enlarged scale, of a portion of FIG. 1, showing the hooking means in active position, their support being supposed to have been retracted for the sake of simplified illustration, whereas, in fact, this support is necessarily expanded when the hooking means are in active position;

FIG. 2a shows, on a further enlarged scale, a detail of FIG. 2, the hooking means being in inactive position;

Figure 1:
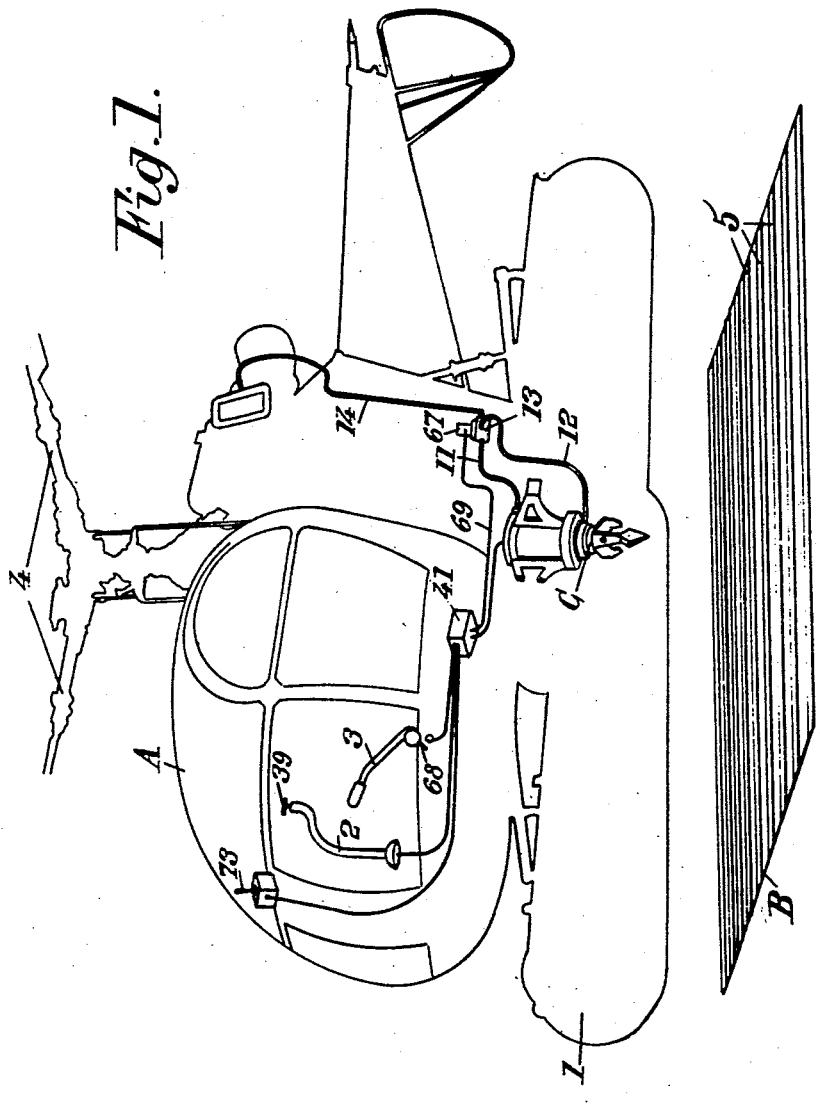
FIG. 1 is a diagrammatic perspective view of a helicopter provided with a mooring device according to the invention.
Figure 3:
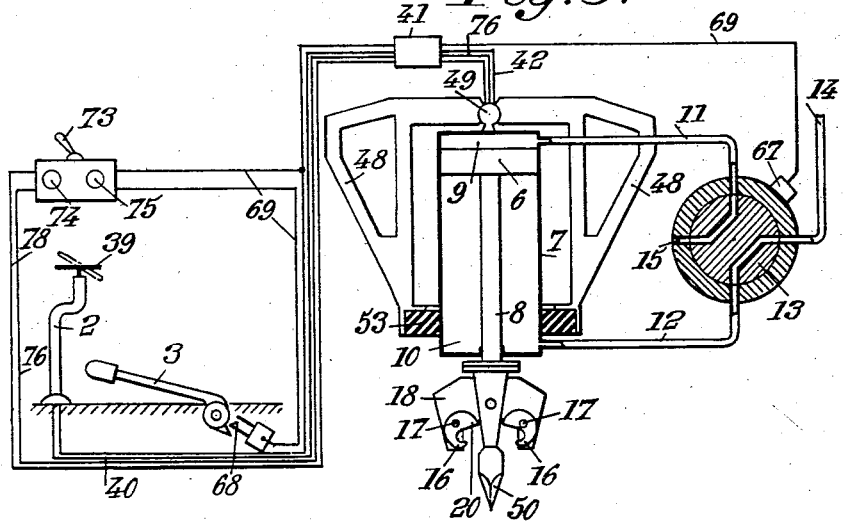
Figure 4:
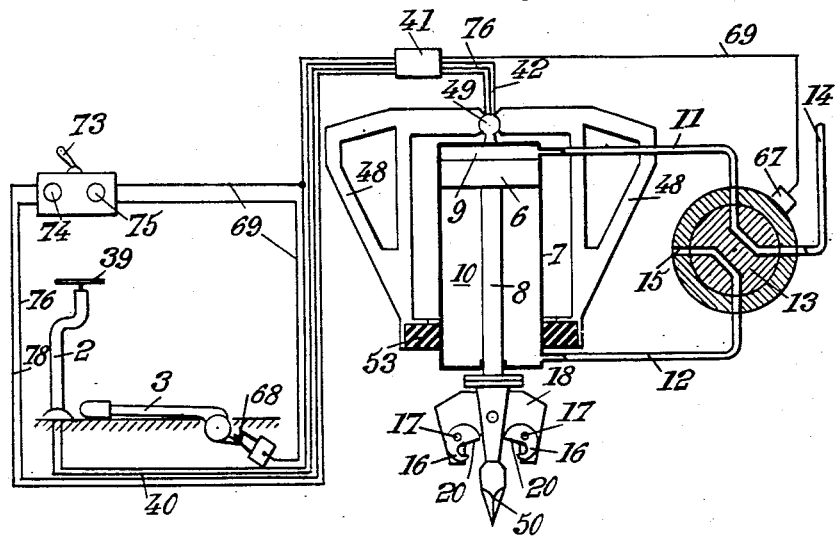

FIGS. 3, 4 and 5 diagrammatically show the device of FIG. 1, respectively in position for flight, in a position preceding landing and in mooring position;

FIG. 6 shows the only one of the elements of FIG. 5 that moves immediately after mooring;

FIGS. 7 to 9 illustrate the automatic positioning of the hooking means with respect to the bars of the grid, FIG. 7 being an elevation view corresponding to transverse adjustment and FIGS. 8 and 9 plane views corresponding to angular adjustment.

The helicopter A shown by the drawing has a landing gear consisting of floats 1. It comprises, in the conventional manner a joystick 2, and a lever 3 to control the collective pitch of the blades 4 (FIG. 1) of the rotor.

The mooring device consists of the combination of the following elements:

(a) A substantially horizontal grid B mounted on the landing platform, the bars 5 of this grid consisting of stretched cables or of round section irons extending parallel to one another, at equal intervals; and (b) A support C for hooking means capable of cooperating with at least one of the bars 5 of grid B, this support C being mounted on helicopter A in such manner that it can receive either an effort directed downwardly at the time of landing or an effort directed upwardly at the time of mooring or at the time of taking off.

Advantageously, this support C consists of a piston 6 (FIG. 2) slidable in a cylinder 7 fixed to the lower part of the helicopter and the rod 8 of which can project from the bottom of cylinder 7. The whole of cylinder 7 and piston 6 constitutes a double action jack, the upper chamber 9 or the lower chamber 10 being adapted to be placed in communication through pipes 11 and 12 and a four-way valve 13 with a source of fluid under pressure and with a discharge space, respectively, or inversely. When the helicopter is fitted with a turbomotor this fluid under pressure may advantageously consist of compressed air collected from the compressor of the turbo-motor through a pipe 14. In this case the above mentioned discharge space is the atmosphere and valve 13 is provided, for this purpose, with a discharge orifice 15.

The hooking means consist of two hooks 16 pivoted symmetrically, about respective parallel axes 17, to a plate 18 fixed with respect to rod 8, these hooks being intended to engage respectively under two adjacent bars 5 of grid B (FIGS. 2, 5 and 7). In order to make this engagement automatic, these hooks are subjected to the action of springs 19 which tend to move the points of the hooks away from each other to a distance $a$ (FIG. 2a) greater than the distance $b$ (FIG. 8) existing between the external vertical planes tangent to two adjacent bars. These hooks are provided with heels 20 which, when their points are at a distance $a$ from each other, are at a distance $c$ from each other smaller than distance $b$, the distance between axes 17 being itself generally greater than distance $a$. Finally, hooks 16 are provided with a retractable locking device capable of holding them in active position as soon as, in response to the contact of heels 20 with two bars 5, the hooks have swung under said bars.

As shown by FIGS. 2 and 2a the locking device of each hook is constituted by a roller 21 journalled on one end of a lever 22 belonging to a first pair of levers 22–23 pivoted together at 25, the second lever 23 of this pair being pivoted at 24 to plate 18. The common pivot axis 25 of this first pair of levers 22–23 is carried by one end of a lever 26 belonging to a second pair of levers 26–27 pivoted together at 29, this second lever 27 of the second pair of levers being pivoted at 28 to plate 18. The common pivot axis 29 of the second pair of levers is slidably guided in a slot 30 provided in a piece 31, which is connected by a pin 32 to a rod 33, slidable inside piston rod 8 and which is urged in the downward direction by a spring 34. The whole system is arranged in such manner that this spring tends to bring lever 26 into line with lever 27 and lever 22 into line with lever 23 so as to apply roller 21 into a locking notch 35 which is located, along the heel portion 20 of the hook after a portion 36 in the form of a circular arc concentric with axis 17.

In order to retract the above described locking device there is provided a remote control device consisting of an electro-magnet the winding 37 of which is fixed with respect to piston rod 8 and the core 38 of which is fixed to rod 33. Electro-magnet 37 may be fed with current at the pilot's will by means of a contactor 39 mounted on joystick 2, through a conductor 40, an electric distribution box 41 and conductors 42.

In order to remedy a failure of electro-magnet 37, I provide means for manually releasing the locking device which may be operated from the landing platform. Such means may consist of a sliding piece 43 connected through a lug 44 to a cam 45 pivoted on plate 18 about an axis 46 and provided with a projection 47 adapted to bear against the end of rod 33 when sliding piece 43 is pulled.

In order to obtain a correct operation of the mooring device when the helicopter is landing, hooks 16 must be disposed, at this time, symmetrically with respect to two adjacent bars 5 of the grid. If it is supposed that the helicopter, when landing, moves in a direction parallel to the vertical planes passing through the bars, the support of the hooking means must be capable of moving transversely into correct position (i.e. in a direction perpendicular to that of the bars) but the plane of axes 17 must however remain substantially parallel to that of the grid. If it is supposed that the helicopter, when landing, makes an angle with the longitudinal direction of the bars, the support of the hooking means must be capable of coming into correct position by rotating about an axis perpendicular to the plane of grid B. To comply with both of these conditions I provide two automatic position adjustment devices which will now be described successively.

The device for adjustment of the lateral position is made as follows: Cylinder 7 is mounted in a frame 48 (belonging to the helicopter) through a swivel connection 49 and I provide, between cylinder 7 and frame 48, resilient return means urging said cylinder toward a middle position. Furthermore, rod 8, or rather an element 51 in line with this rod, carries a guiding point 50 located between hooks 16 and plate 18 is pivotable with respect to said element 51 about an axis 52 parallel to axes 17.

The resilient means for returning cylinder 7 into middle position consist of a rubber ring 53. But, for some operations, in particular when the helicopter is to be lifted onto a carriage by means of the double action jack consisting of cylinder 7 and piston 6, means are provided for making rigid the connection between cylinder 7 and frame 48. Said means comprise a metallic rotating annular member 54 carrying rollers 55 adapted to run along the inner periphery of a circular track 56 provided in frame 48 until they come into contact with projections 57 provided at intervals on cylinder 7. If, by means of a remote control system acting upon a lug 58, carried by metallic annular member 54, rollers 55 are brought into contact with projections 57, any transverse displacement of cylinder 7 with respect to frame 48 is prevented, whereas if rollers 55 are brought out of contact with projections 57, the bottom part of cylinder 7 can move transversely with respect to frame 48 within the limits permitted by the deformation of rubber ring 53.

Guiding point 50 is preferably made of natural or synthetic rubber so that it can rebound on a bar 5 which it would strike. It should be noted that the fact that plate 18 is pivotally mounted on piston rod 8 does not interfere with the operation of the means for releasing hooks 16 if care has been taken to provide a sufficient transverse play, for instance in the connection provided by axis 32 between piece 31 and rod 33.

The device for adjusting the hooking means by rotation is made as follows: Element 51 is rotatable with respect to rod 8 with which it is coaxial, by means of bearings 59. Between piston rod 8 and element 51 there are provided resilient return means which urge said element toward a given angular position with respect to rod 8. Said rod is prevented from rotating with respect to cylinder 7. The resilient return means consist of a coil spring 60 which is housed in two circular grooves located opposite each other in circular flanges 61–62 respectively carried by rod 8 and element 51 (FIG. 2a), this spring 60 being held between two projections 63 and 64 carried respectively by flanges 61 and 62. But rod 8 and cylinder 7 can be prevented from rotating with respect to each other about their common vertical axis engaging a projection 65 fixed with respect to cylinder 7 into a longitudinal groove 66 provided in rod 8 (see FIG. 2a).

Finally, in order to lower piston rod 8 at the time of landing I may make use of automatic control means operatively connected with the lever 3 serving to control the collective pitch of the rotor blades. I may also provide manual control independently operated by the pilot.

If it is supposed that valve 13 is actuated by an electric motor (or electro-magnet) 67, automatic control may be obtained:

On the one hand by means of a switch 68 actuated by lever 3 (FIG. 1) in such manner that, when the pitch of the rotor blades is minimum, this lever causes, through conductor 69, current to be fed to motor 67, so that the upper chamber 9 of the jack is placed under pressure while the lower chamber 10 of said jack is connected to the discharge orifice, through valve 13 (FIGS. 4 and 5);

And on the other hand by means of a switch (not visible on the drawings) which permits the feed of current to the circuit of motor 67 only when hooks 16 have been brought out of action. As shown by FIG. 2a this second switch may be controlled by a relay (not shown) the energizing circuit of which comprises a disc 70 made of a conducting material carried and earthed by rod 33 and a conducting ring 71 carried by electro-magnet 37, from which it is insulated, said relay being housed in box 41 and being connected to ring 71 by a conductor 72.

The automatic control serving to lower piston rod 8 is generally accompanied by a manual control the contact means of which may be combined with the switch 39 serving to release the hook locking means. Displacement of this switch in order to operate motor 67 then takes place in one direction (position in dotted lines in FIG. 3) whereas its displacement in order to energize electro-magnet 37 takes place in the opposite direction (position in dotted lines in FIG. 5). Anyway a switch operated by a lever 73 is provided in order to place the automatic control switch 68 (FIG. 1) out of circuit, in particular when the aircraft is to be landed on a platform which is not provided with a grid.

Two luminous signals 74 and 75 are provided to indicate whether piston rod 8 is wholly retracted or whether it is projecting downwardly with hooks 16 engaged under the bars 5 of the grid. The first luminous signal, 74, may be fed with current through conductors 76 and a switch 77 operated by a push-piece interposed between the top end of cylinder 7 and piston 6. The second luminous signal, 75, is fed with current through conductors 78 when disc 70 is in contact with ring 71. Finally, a spring mounted sliding locking member 79 (FIG. 2) may be provided to permit the lowering of piston 6 only when a given minimum pressure exists in the upper chamber 9 of the jack.

The above mentioned mooring device works as follows:

When the helicopter is flying, the parts of the device occupy the positions shown by FIG. 3. Lever 73 is in the automatic working position (that is to say that for which switch 68 is in the circuit) and luminous signal 74 is on, which means that piston 8 is in the upper position (in contact with the push-piece of switch 77). Motor 67, which controls valve 13, is not operated and said valve keeps the lower chamber 10 under pressure while the upper chamber 9 is connected with the discharge orifice. Lever 3, which serves to control the general pitch of the rotor blades, is lifted. Hooks 16 are at the maximum distance from each other as shown by FIG. 2a.

When the helicopter is about to land, the parts of the device are in the positions of FIG. 4, the pilot having lowered lever 3. This operation produces, due to the closing of switch 68 and to the feed of current to motor 67, a rotation of valve 13. The upper chamber 9 is thus subjected to the action of fluid under pressure whereas the lower chamber 10 is connected to the discharge orifice, but piston 6 is kept in its upper position by resilient locking member 79 (FIG. 2) until the pressure in the upper chamber 9 has become sufficient to overcome the resistance of this locking member.

When piston 6 starts moving in the downward direction, luminous signal 74 is switched off and the device comes into the position of FIG. 5. Piston 6 is now in its lowest position and point 50 engages between two bars 5 of the grid. If swivel member 49 is not exactly above the middle of the space between these two bars, the point 50, sliding against the bar that it has first met causes cylinder 7 to pivot about the center of said swivel member 49, thus causing rubber ring 53 to be deformed (FIG. 7). Therefore piston rod 8 is no longer located in a direction perpendicular to the plane of the grid, but plate 18 turns through a small angle about its axis 52 so as to keep the plane of the axes 17 of the hooks parallel to the plane of the grid.

If, now, the fore-and-aft direction of the helicopter, as it is above to land, is not parallel to the bars 5 of the grid, that is to say if there is an angle D (FIG. 8) between the direction of these bars and the longitudinal plane of symmetry P of point 50, this plane P being parallel to the axes 17 of the hooks, point 50 can engage its lower end between two bars, but as said point is wedge-shaped the contact between the lateral faces of said point 50 and said bars compels the point to rotate about bearings 59, thus compressing spring 60. The axes 17 of the hooks have thus been brought parallel to bars 5 (FIG. 9).

When rod 8 has moved down sufficiently, the heel portions 20 of hooks 16 simultaneously come into contact with the two bars 5 between which point 50 has passed, which causes said hooks 16 to pivot about their axes 17 against the action of springs 19. The hooks are thus engaged under the grids of the bar, after which they are locked in this position due to the fact that rollers 21 are pushed into notches 35 by the action of spring 34 (locked position shown by FIG. 2 and by FIG. 5). This locking action is accompanied by the contact of disc 70 with ring 71 which, on the one hand causes luminous signal 75 to be switched on and on the other hand cuts off the energizing of motor 67 by the action of the above mentioned relay not illustrated by the drawings. Valve 13 now comes into the position of FIG. 6 where the lower chamber 10 of the jack is placed under pressure whereas the upper chamber 9 is connected with the discharge orifice, the other elements remaining in the position of FIG. 5. Rod 8 is then pushed upwardly so that the helicopter is applied against the grid with a force sufficient to prevent any displacement thereof with respect to the platform. Once the helicopter has been secured through other suitable means, the pilot can stop the feed of fluid under pressure to the lower chamber 10 of the jack.

When the helicopter is to take off, the engine thereof (supposed to be a turbo-motor) is run to its normal speed and the fluid under pressure supplied by said engine is fed to the lower chamber 10 of the jack so as to secure once more the helicopter with respect to the platform. It is then possible to remove the other fastening means which have been provided, thus permitting take off. At this time hooks 16 may be retracted in two different ways. Either the pilot brings switch 39 into the position shown in dotted lines in FIG. 5, which energises electro-magnet 37, pulls rollers 21 from notches 35 and enables springs 19 to bring hooks 16 into the position of FIG. 2. Or sliding piece 43 is pulled out from the outside. I might also provide for an automatic retraction of hooks 16 through control means operatively connected with lever 3 and arranged to release the locking means when the pitch of the rotor blade exceeds a given value. The helicopter which is instantaneously released takes off whereas piston 6 comes back to the position of FIG. 2 where the whole of the mooring device is located above the resting plane of the landing gear. It is then possible either to cut off the air-circuit in the case of a flight of long duration or to leave the jack under pressure for a new landing. In order to cut off the air-circuit I may make use of a four-way valve (not shown) advantageously arranged to enable the pilot to operate the jack in case of failure of the automatic control means.

When the helicopter has a landing gear without floats, I may further provide a device for preventing rotation of the helicopter about a vertical axis with respect to the platform on which it is moored.

The device according to my invention ensures a high safety of operation. Furthermore it permits landing whatever be the direction of the fore-and-aft plane of symmetry of the helicopter with respect to the bars of the grid.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A mooring device for securing a V.T.O.L. aircraft to a platform, this device comprising a horizontal grid secured on said platform and having a plurality of parallel bars, a support mounted on the aircraft and extending downwardly under it, said support being mounted movable upwardly and downwardly with respect to the aircraft, means carried by the aircraft and operable by the pilot thereof for moving said support upwardly and downwardly with respect to the aircraft, a part carried by said support and rotatable with respect thereto about a vertical axis, hooking means adapted to cooperate with said grid by engagement between the bars thereof, said hooking means being pivotally carried by said part about horizontal axes, respectively, and a guiding point, fixed to said part, said point having a flat shape and having a thickness smaller than the interval between two adjacent bars, this thickness being perpendicular to the pivot axes of said hooking means.

2. A mooring device for securing a V.T.O.L. aircraft to a platform, this device comprising a horizontal grid secured on said platform and having a plurality of parallel bars, a substantially vertical cylinder carried by the aircraft and extending downwardly under it, a piston slidable in said cylinder so as to be movable upwardly and downwardly with respect to the aircraft, fluid pressure means operable by the pilot thereof for moving said piston upwardly and downwardly with respect to the aircraft, a part carried by said support and rotatable with respect thereto about a vertical axis, hooking means adapted to cooperate with said grid by engagement between the bars thereof, said hooking means being pivotally carried by said part about horizontal axes, respectively, and a guiding point, fixed to said part, said point having a flat shape and having a thickness smaller than the interval between two adjacent bars, this thickness being perpendicular to the pivot axes of said hooking means.

3. A mooring device for securing a V.T.O.L. aircraft to a platform, this device comprising a horizontal grid secured on said platform and having a plurality of parallel bars, a vertical cylinder carried by the aircraft and extending under it, a piston fitting slidably in said cylinder, a rod rigid with said piston, a vertical plate carried by said rod, hooking means consisting of two hooks pivoted to said plate about respective axes perpendicular thereto, said axes being at a distance from each other greater than the distance between two adjacent bars of said grid, said hooks being symmetrically disposed with respect to the axis of said piston rod, said hooks having their points located at the bottom parts thereof, spring means operatively connected with said hooks for resiliently holding the respective hook points at a maximum distance from each other greater than the distance between the respective external sides of two adjacent bars of said grid, hooks comprising heel portions disposed above said points and located, when said points are at said maximum distance from each other, at a distance from each other smaller than said distance between the respective external sides of two adjacent bars of said grid, releasable locking means for holding said hooks in the relative positions where their points are engaged under two adjacent bars of said grid respectively, and fluid pressure means operable by the pilot of the aircraft for moving said piston in said cylinder.

4. A mooring device for securing a V.T.O.L. aircraft to a platform, this device comprising a horizontal grid secured on said platform and having a plurality of parallel bars, a double action jack comprising a vertical cylinder carried by the aircraft and extending under it and a piston fitting slidably in said cylinder, hooking means carried by said piston, said hooking means being adapted to cooperate with said grid by engagement between the bars thereof, and fluid pressure means leading to both ends of said cylinder and operable by the pilot of the aircraft for moving said piston in said cylinder in either direction.

5. A mooring device according to claim 4, said aircraft being a helicopter propelled by a turbo-motor wherein the fluid pressure means is fed with compressed air supplied by said turbo-motor.

6. A mooring device for securing a V.T.O.L. aircraft to a platform, this device comprising a horizontal grid secured on said platform and having a plurality of parallel bars, a substantially vertical support mounted on the aircraft and extending downwardly under it, said support being slidable vertically with respect to the aircraft so as to be retractable with respect thereto, means carried by the aircraft and operable by the pilot thereof for moving said support upwardly and downwardly with respect to the aircraft, hooking means adapted to cooperate with said grid for engaging the under sides of the bars thereof when pushed downwardly through said grid, said hooking means being pivotally carried by said support about horizontal axes, respectively, and means operatively connected with said hooking means for urging said support upwardly with respect to the aircraft as soon as said hooking means are in engagement with the under sides of said grid bars.

References Cited in the file of this patent
UNITED STATES PATENTS

| | | |
|---|---|---|
| 2,403,456 | Pitcairn | July 9, 1946 |
| 2,864,572 | Tomple | Dec. 16, 1958 |
| 3,075,731 | Bennett et al. | Jan. 29, 1963 |